United States Patent [19]

Blomquist et al.

[11] Patent Number: 5,606,121

[45] Date of Patent: Feb. 25, 1997

[54] METHOD OF TESTING AN EVAPORATIVE EMISSION CONTROL SYSTEM

[75] Inventors: William B. Blomquist, Clarkston; Gary D. Dawson, Rochester; Roland T. Richardson, Detroit; Glen Tallarek, Grosse Pointe Woods, all of Mich.; John E. Letcher, Glendale, Ariz.; Mark E. Hope, Ann Arbor, Mich.

[73] Assignee: Chrysler Corporation, Auburn Hills, Mich.

[21] Appl. No.: 611,137

[22] Filed: Mar. 5, 1996

[51] Int. Cl.$^6$ ................................................. G01M 15/00
[52] U.S. Cl. ........................................ 73/118.1; 73/49.7
[58] Field of Search ............................. 73/115, 116, 117.2, 73/117.3, 118.1, 118.2, 23.31, 40, 49.2, 49.7, 49.5

[56] References Cited

U.S. PATENT DOCUMENTS

| | | |
|---|---|---|
| 2,552,261 | 5/1951 | Coughlin . |
| 3,162,132 | 12/1964 | Kling . |
| 4,794,790 | 1/1989 | Margarit-Metaxa et al. . |
| 4,846,119 | 7/1989 | Geyer et al. . |
| 5,146,902 | 9/1992 | Cook et al. . |
| 5,150,689 | 9/1992 | Yano et al. . |
| 5,158,054 | 10/1992 | Otsuka . |
| 5,182,945 | 2/1993 | Setter . |
| 5,187,973 | 2/1993 | Kunze et al. . |
| 5,191,870 | 3/1993 | Cook . |
| 5,193,512 | 3/1993 | Steinbrenner et al. . |
| 5,239,858 | 8/1993 | Rogers et al. . |
| 5,243,853 | 9/1993 | Steinbrenner et al. ............. 73/118.1 |
| 5,245,973 | 9/1993 | Otsuka et al. . |
| 5,263,460 | 11/1993 | Baxter et al. . |
| 5,267,470 | 12/1993 | Cook . |
| 5,275,144 | 1/1994 | Gross . |
| 5,284,050 | 2/1994 | Iida et al. . |
| 5,317,909 | 6/1994 | Yamada et al. . |
| 5,383,437 | 1/1995 | Cook et al. . |
| 5,408,866 | 4/1995 | Kawamura et al. . |
| 5,411,004 | 5/1995 | Busato et al. . |
| 5,445,015 | 8/1995 | Namiki et al. ..................... 73/118.1 |
| 5,467,641 | 11/1995 | Williams et al. ................... 73/49.7 |
| 5,495,749 | 3/1996 | Dawson et al. . |
| 5,499,614 | 3/1996 | Busato et al. . |
| 5,507,176 | 4/1996 | Kammeraad et al. .............. 73/49.7 |
| 5,509,296 | 4/1996 | Kolb ..................................... 73/49.7 |

FOREIGN PATENT DOCUMENTS 2681098 9/1991 France .

*Primary Examiner*—Richard Chilcot
*Assistant Examiner*—George M. Dombroske
*Attorney, Agent, or Firm*—Mark P. Calcaterra

[57] ABSTRACT

A method of testing an evaporative emission control system to determine if the evaporative emission control system has reached a predetermined pressure includes the steps of pulsing a leak detection pump at a predetermined rate and determining if a last pump period is greater than or equal to a predetermined test mode period threshold. The method also includes the steps of pressurizing the evaporative emission control system if the last pump period is less than a test mode period threshold and continuing the method if the last pump period is equal to or greater than the test mode period threshold.

6 Claims, 17 Drawing Sheets

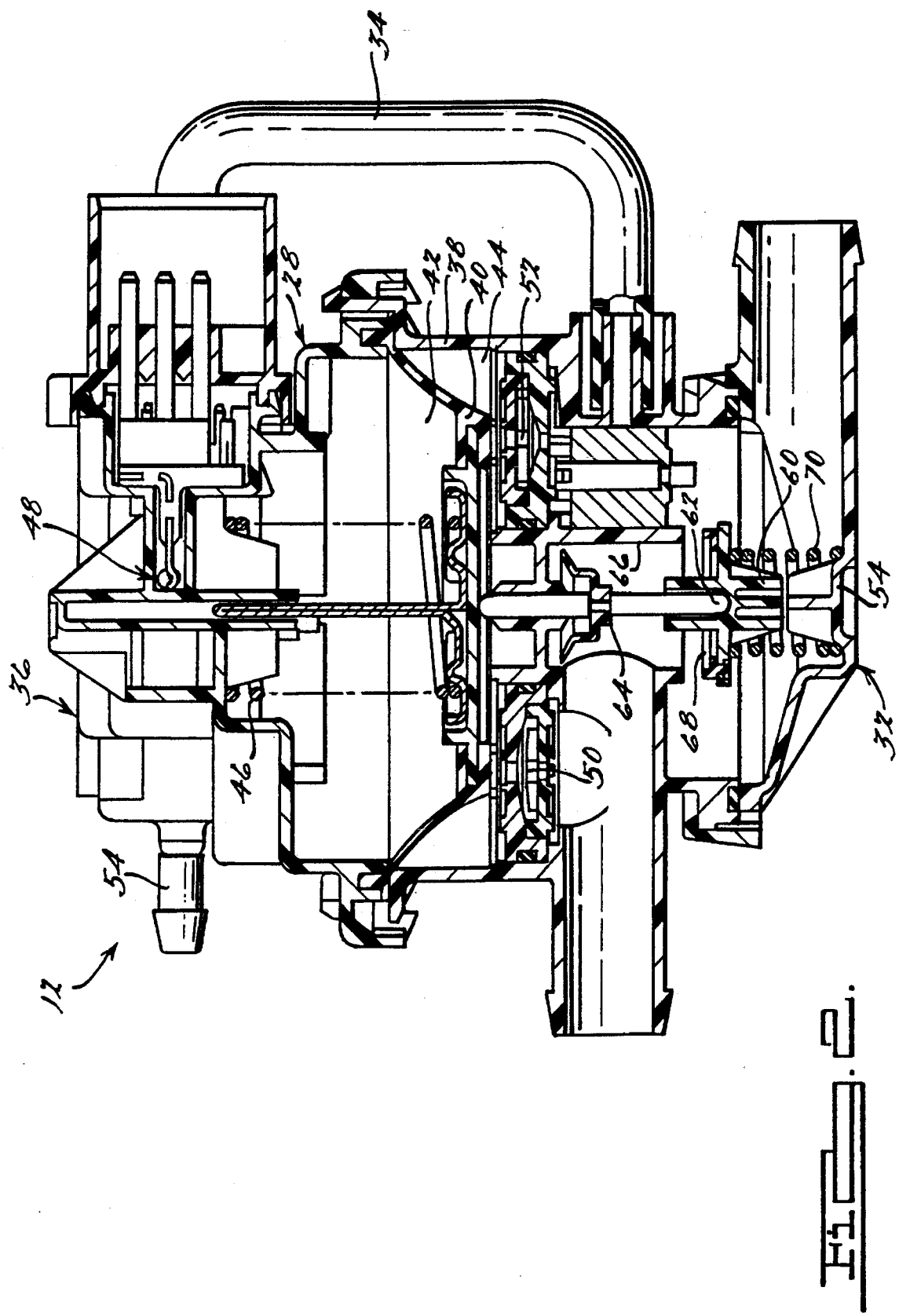

METHOD OF TESTING AN EVAPORATIVE EMISSION CONTROL SYSTEM

BACKGROUND OF THE INVENTION

1. Field of the Invention

The present invention relates generally to an evaporative emission control system for automotive vehicles and, more particularly, to a method of testing an evaporative emission control system of an automotive vehicle.

2. Description of the Related Art

Automotive vehicles typically include a fuel tank and an evaporative emission control system that collects volatile fuel vapors generated in the fuel tank. The evaporative emission control system includes a vapor collection canister, usually containing an activated charcoal mixture, to collect and store the emitted fuel vapors. Normally, the vapor collection canister collects volatile fuel vapors which accumulate during refueling of the automotive vehicle or from increases in fuel temperature. During conditions conducive to purging the fuel vapors from the collection canister, a purge valve placed between an intake manifold and the canister is opened by an engine control unit in an amount determined by the engine control unit to purge the canister; i.e., the stored vapors are drawn into the intake manifold from the canister for ultimate combustion within a combustion chamber of an engine.

Governmental regulations require that certain vehicles powered by volatile fuels such as gasoline have their evaporative emission control systems checked to determine if a leak exists in the system. Therefore, there is a need in the art to provide on board vehicle diagnostic systems to determine if a leak is present in a portion of the evaporative emission control system.

SUMMARY OF THE INVENTION

It is, therefore, one object of the present invention to provide a method of leak detection for testing the integrity of an evaporative emission control system for an automotive vehicle.

It is another object of the present invention to provide a method of testing an evaporative emission control system.

To achieve the foregoing objects, the present invention is a method of testing an evaporative emission control system to determine if the evaporative emission control system has reached a predetermined pressure. The method includes the steps of pulsing a leak detection pump at a predetermined rate and determining if a last pump period is greater than or equal to a predetermined test mode period threshold. The method also includes the steps of pressurizing the evaporative emission control system if the last pump period is less than the test mode period threshold and continuing the method if the last pump period is equal to or greater than the test mode period threshold.

One advantage of the present invention is that a method is provided for detecting a leak in an evaporative emission control system of an automotive vehicle. Another advantage of the present invention is that the method tests the evaporative emission control system.

Other objects, features and advantages of the present invention will be readily appreciated as the same becomes better understood after reading the subsequent description taken in conjunction with the accompanying drawings.

BRIEF DESCRIPTION OF THE DRAWINGS

FIG. 2 is a fragmentary side view of a leak detection pump and valve assembly of the evaporative emission control system of FIG. 1.

DESCRIPTION OF THE PREFERRED EMBODIMENT (S)

Figure 1:
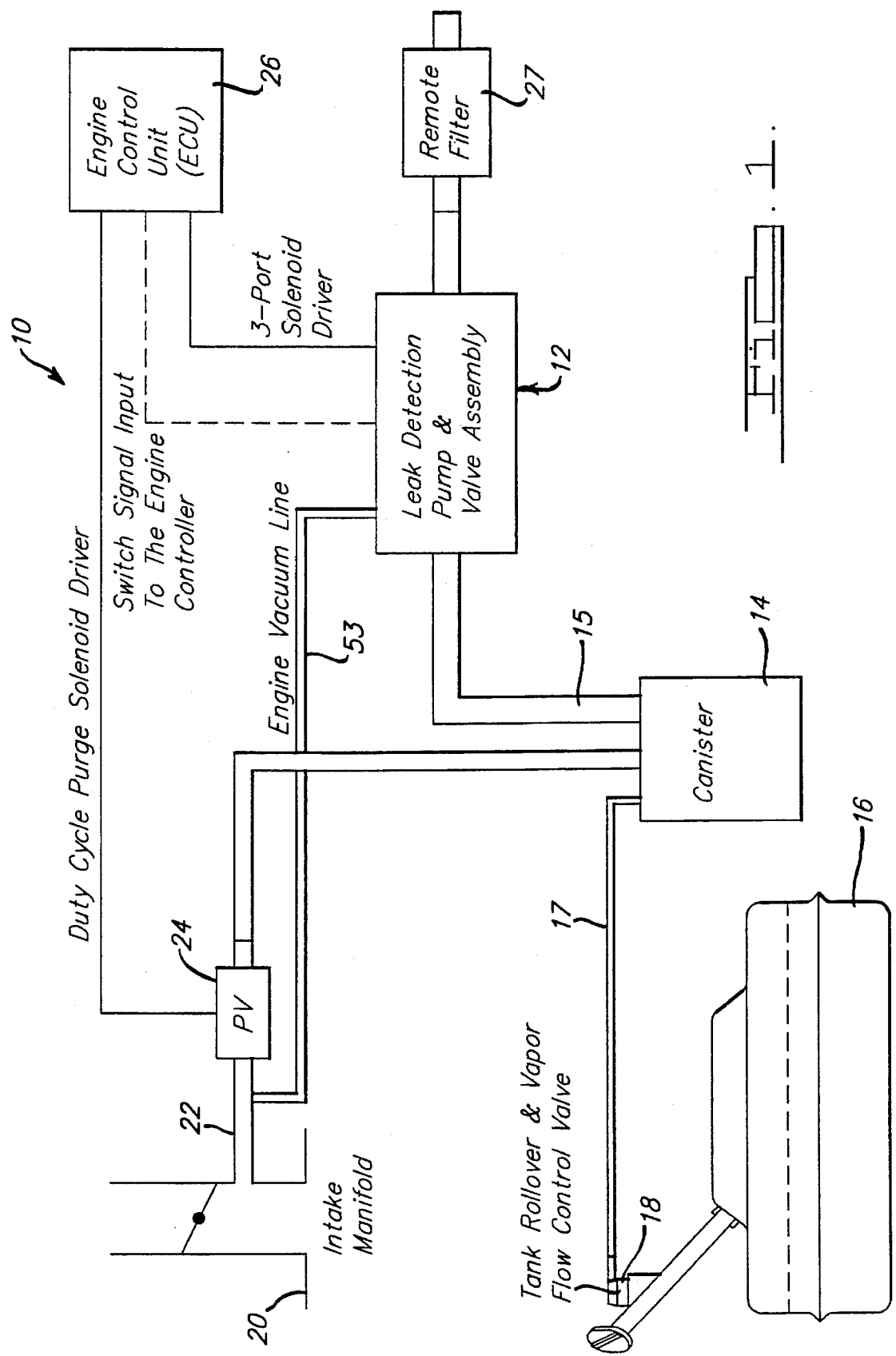
FIG. 1 is a schematic diagram of an evaporative emission control system according to the present invention.

Referring to FIG. 1, an evaporative emission control system 10 is shown for an automotive vehicle (not shown) including a leak detection pump and valve assembly, generally indicated at 12. The control system 10 also includes a carbon canister 14 connected by a conduit 15 to the leak detection pump and valve assembly 12. A fuel tank 16 is connected to the carbon canister 14 by a tank rollover and vapor flow control valve 18 and a conduit 19. This is a representative example of several possible means by which the fuel tank 16 is connected to the carbon canister 14. An intake manifold 20 is connected to the carbon canister 14 by a conduit 22. The control system 10 includes a purge valve 24 mounted on the conduit 22. The control system 10 also includes an engine control unit 26 connected to and operative to control the leak detection pump and valve assembly 12 and the purge valve 24. The control system 10 includes a remote filter 27 connected to the leak detection pump and valve assembly 12 and atmosphere.

In operation, a supply of volatile liquid fuel for powering an engine (not shown) of the automotive vehicle is placed in the fuel tank 16. As fuel is pumped into the fuel tank 16 or as the temperature of the fuel increases, vapors from the fuel pass through the conduit 19 and are received in the canister 14. The purge valve 24 is normally closed. Under certain vehicle operating conditions conducive to purging, the engine control unit 26 operates the purge valve 24 such that a certain amount of engine intake vacuum is delivered to the canister 14 causing the collected vapors to flow from the canister 14 through the conduit 22 and the purge valve 24 to the intake manifold 20 for combustion in the combustion chambers.

Referring to FIG. 2, the leak detection pump and valve assembly 12 includes a vacuum actuated leak detection pump, generally indicated at 28, and a mechanically actuated canister vent control valve, generally indicated at 32. An atmospheric vent hose 34 interconnects the leak detection pump 28 and atmosphere. It should be appreciated that the vent control valve 32 seals or closes the conduit 15 between the carbon canister 14 and an atmospheric vent in order to positively pressurize the evaporative emission control system 10.

In accordance with the present invention, the leak detection pump and valve assembly 12 is used to perform a test on the integrity of the evaporative emission control system 10. To conduct the test, the engine control unit 26 closes the purge valve 24 and actuates the leak detection pump 28. The vent control valve 32 is mechanically actuated such that a vacuum drawn to activate the leak detection pump 28, results in a corresponding mechanical motion which causes the vent control valve 32 to close and seal the canister 14 from the atmospheric vent and remote filter 27 (FIG. 1). Once the conduit 15 is sealed off, the leak detection pump 28 then positively pressurizes the evaporative emission control system 10 and fuel tank 16 to a predetermined pressure. Once the predetermined pressure is assumed to have been reached, the leak detection pump 28 enters a diagnostic mode to be described. If the control system 10 has a leak, the pressure is reduced and the leak detection pump 28 will sense the reduced pressure and will actuate. The leak detection pump 28 will continue to pump at a rate which will be representative of the flow characteristic as related to the size of the leak. From this information, it can be determined if the leak is larger or smaller than the required detection limit set by applicable governmental standards.

Referring now to FIG. 2, the leak detection pump and valve assembly 12 includes a three-port solenoid, generally indicated at 36. The leak detection pump and valve assembly 12 also includes a housing 38 and a diaphragm 40 disposed within the housing 38 and cooperates with the housing 38 to define a pump actuation cavity 42 and a pump chamber 44. The leak detection pump and valve assembly 12 includes a spring 46 disposed within the pump actuation cavity 42 and acts on the diaphragm 40. The leak detection pump and valve assembly 12 also includes a pump switch 48 mounted to the housing 38 and connected to the engine control unit 26. The leak detection pump and valve assembly 12 includes a pair of one way check valves 50,52 disposed in the housing 38 and a vacuum line 52 which extends from and couples the vacuum drawn by the intake manifold 20 to an inlet port 54 of the three-port solenoid 36. The three-port solenoid 36 is connected to the housing 38 and upon receiving a signal from the engine control unit 26 selectively draws and releases a vacuum in the pump actuation cavity 42. It should be appreciated that when a vacuum is drawn in the pump actuation cavity 42, the diaphragm 40 is pulled upward against the spring 46. When the vacuum is released, the diaphragm 40 is then urged outward by the spring 46 in a pump stroke. The pump switch 48 is placed adjacent the diaphragm 40 such that when the diaphragm 40 reaches a predetermined point in its pump stroke, the pump switch 48 is closed. Closure of the pump switch 48 sends a signal to the engine control unit 26 to activate the three-port solenoid 36 and supply a vacuum to the pump actuation cavity 42.

In operation, the three-port solenoid 36 is energized by the engine control unit 26, and connects the pump actuation cavity 42 with the vacuum drawn by the intake manifold 20 to initialize the leak detection pump 28 by drawing the diaphragm 40 upward and compressing the spring 46. Drawing the diaphragm 40 upward draws atmosphere air in through the remote filter 27 and the one way check valve 52 into the pump chamber 44. The three-port solenoid 36 is then de-energized after a predetermined time period which allows atmospheric pressure to enter the pump actuation cavity 42 whereby the spring 46 drives the diaphragm 40 outward to force the air out of the pump chamber 44 through the second one way check valve 50 into the canister 14 and corresponding elements of the evaporative emission control system 10 through the connecting conduit 15. As the diaphragm 40 reaches a predetermined point in its stroke, the pump switch 48 closes. Closure of pump switch 48 signals the engine control unit 26 to energize the three-port solenoid 36 and provide engine vacuum to the pump actuation cavity 42. In this manner, the cycle is repeated to create flow in a typical diaphragm pump fashion.

As illustrated in FIG. 1, during normal operation of the vehicle, the canister 14 is coupled to the atmospheric vent through the vent control valve 32. In order to pressurize the evaporative emission control system 10, the vent control valve 32 must be closed. The vent control valve 32 includes a housing 54 connected to the housing 38 of the leak detection pump 28. The vent control valve 32 also includes a valve 60 having a valve stem 62 cooperating with the diaphragm 40 at one end and a valve head 64 disposed on the valve stem 62 at the other end. The housing 54 further includes an opening or orifice 66 to allow communication between the canister 14 and the atmospheric vent and the remote filter 27. The vent control valve 32 includes a seal element 68 disposed about the valve head 64. The seal 68 engages and seals the orifice 66 to seal off the canister 14 from the atmospheric vent and the remote filter 27. The vent control valve 32 also includes a spring 70 disposed between the valve 60 and housing 54. The spring 70 acts upon the valve 60 to urge the valve 60 into a closed position. It should be appreciated that when the valve 60 is in an open position, air may be drawn through the atmospheric vent and remote filter 27 past the open valve 60 and into the canister 14.

In order to pressurize the evaporative emission control system 10, the valve 60 must be closed. It should be appreciated that the valve 60 is urged closed when the three-port solenoid 36 is initialized causing a vacuum to be drawn in the pump actuation cavity 42. When a vacuum is drawn in the pump actuation cavity 42, the vacuum moves the diaphragm 40 upward and the spring 70 moves the valve 60 into a closed position wherein the seal element 68 engages the orifice 66.

Figure 3A:
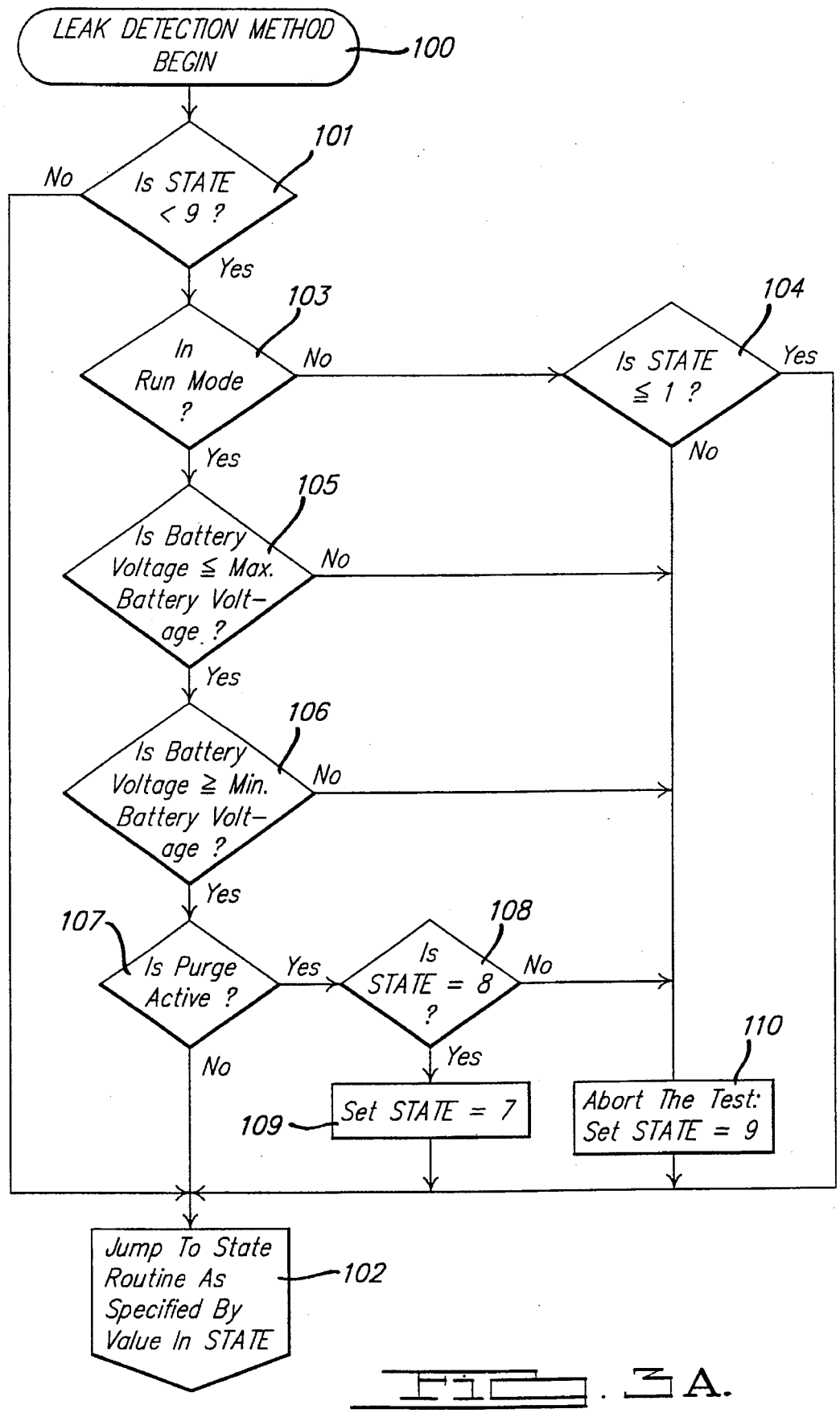
FIGS. 3A through 3P are flowcharts of a method of leak detection, according to the present invention, for the evaporative emission control system of FIGS. 1 and 2.
Figure 3B:
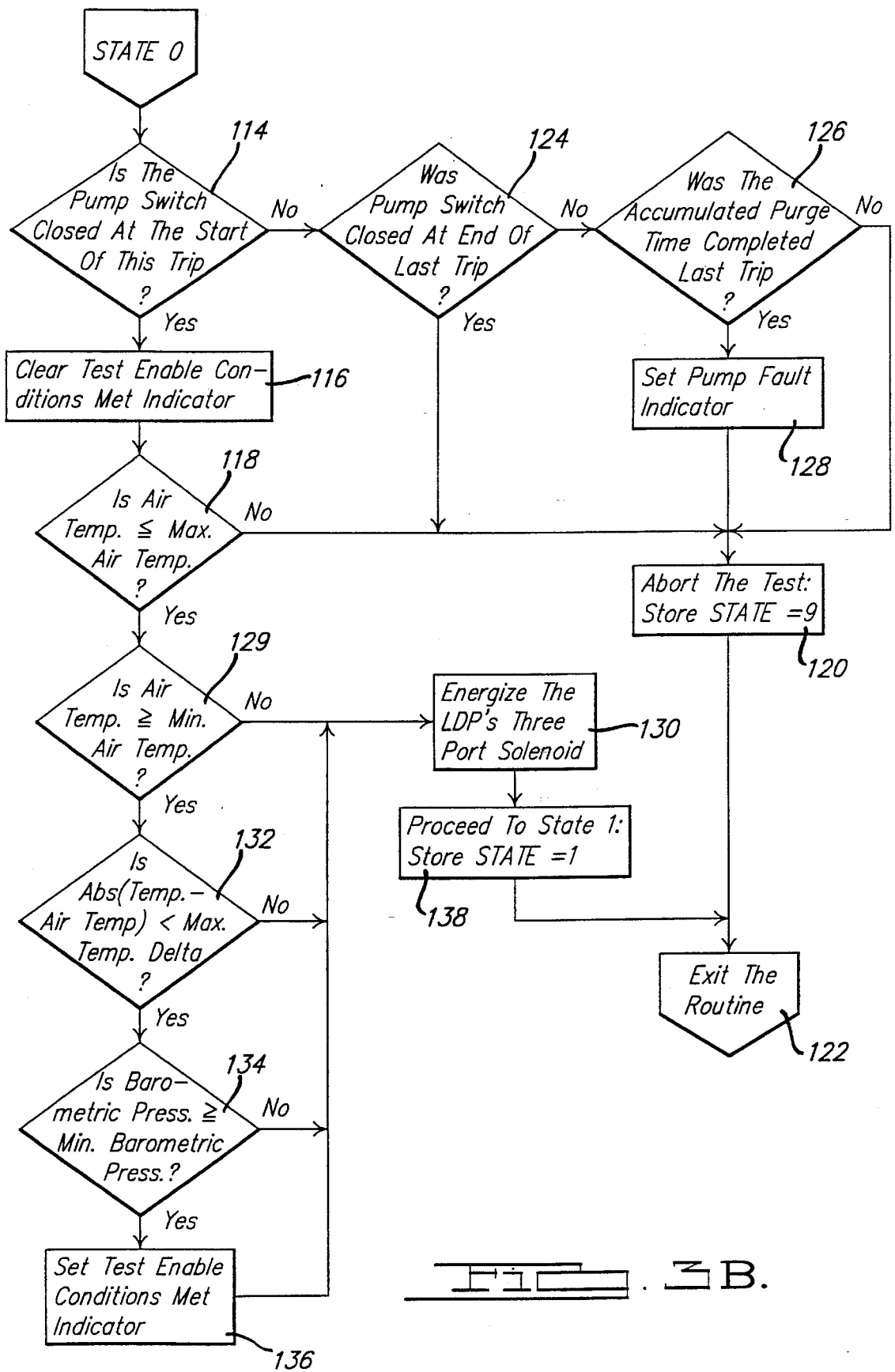
Figure 3C:
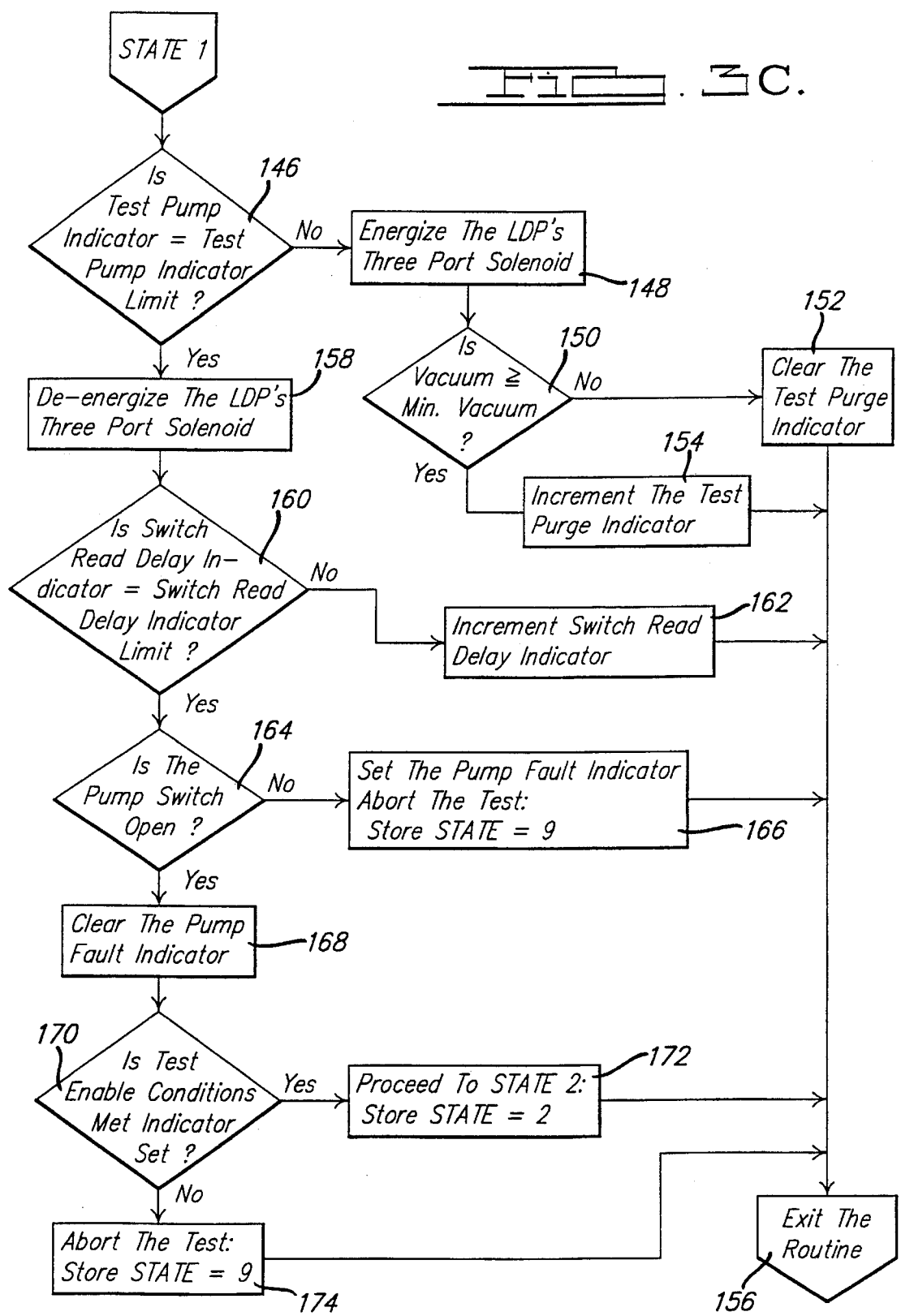
Figure 3D:
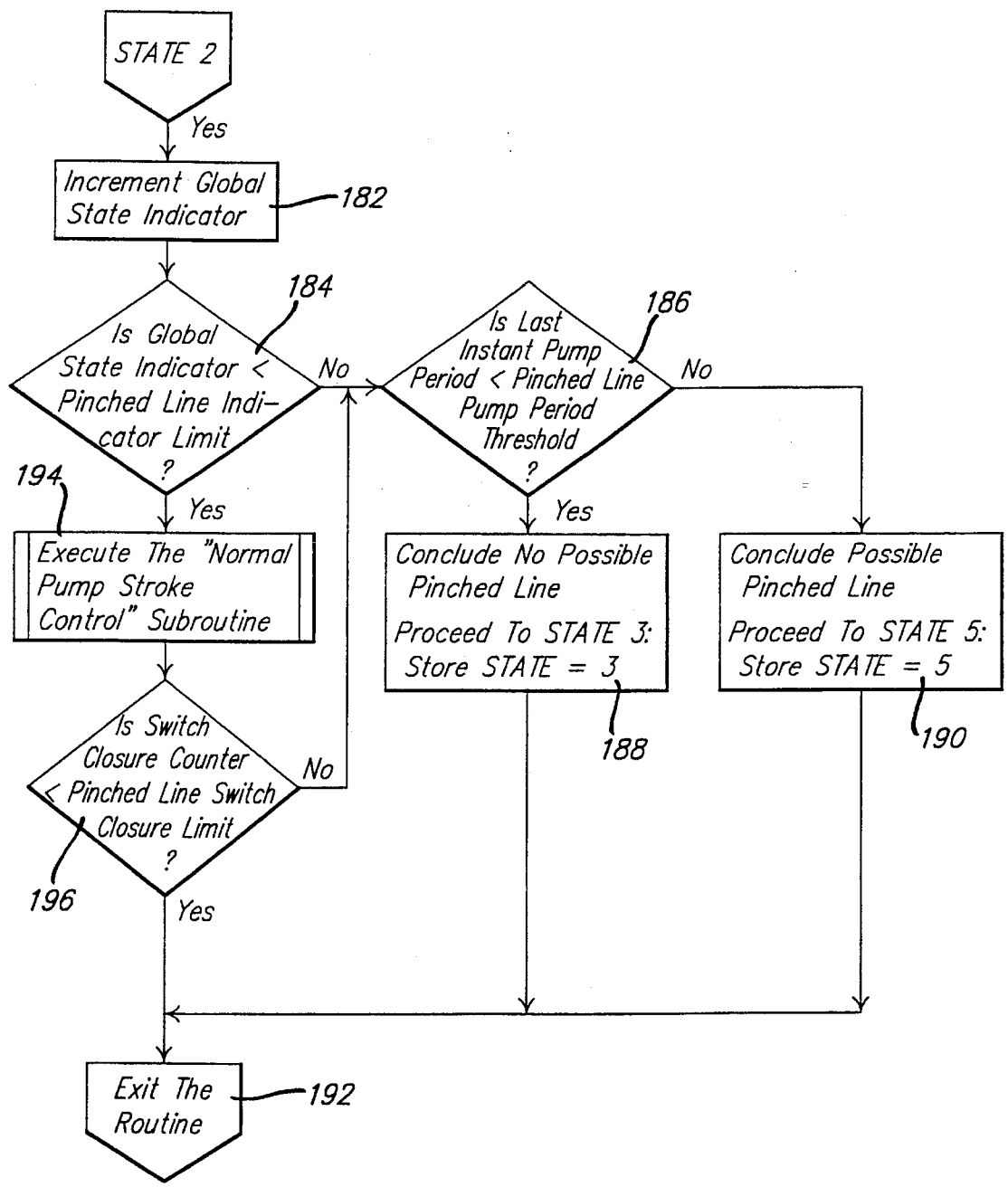
Figure 3E:
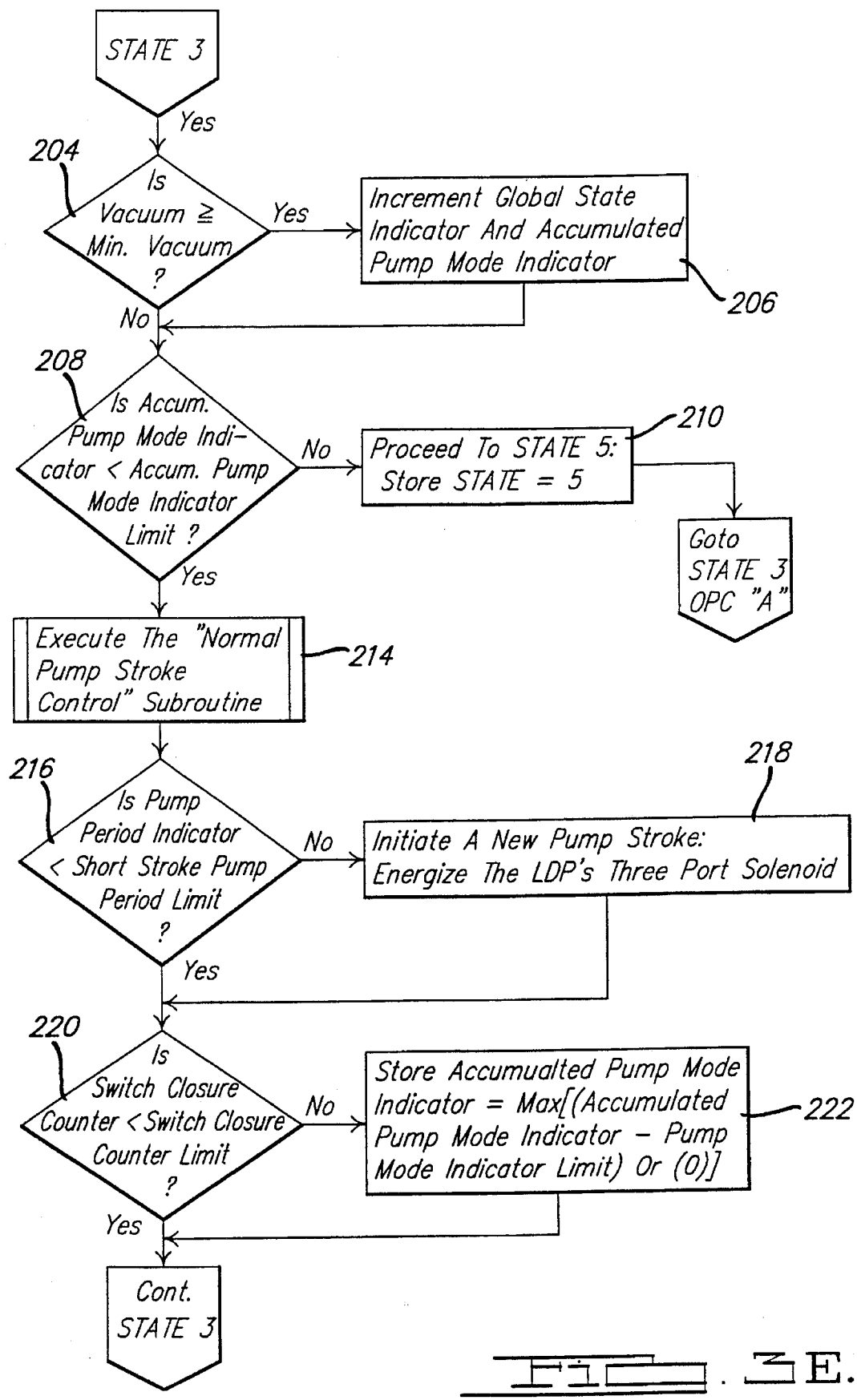
Figure 3F:
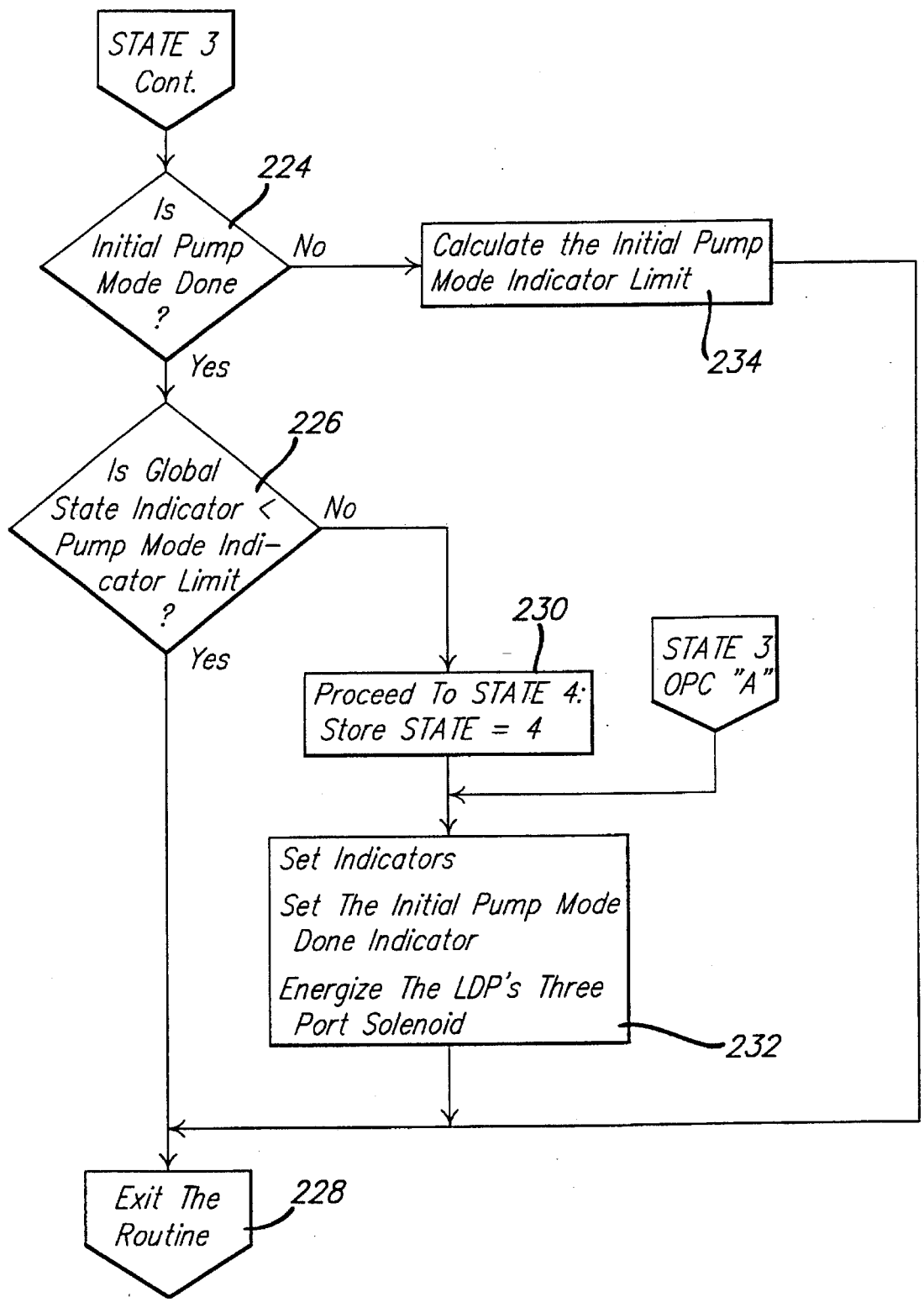
Figure 3G:
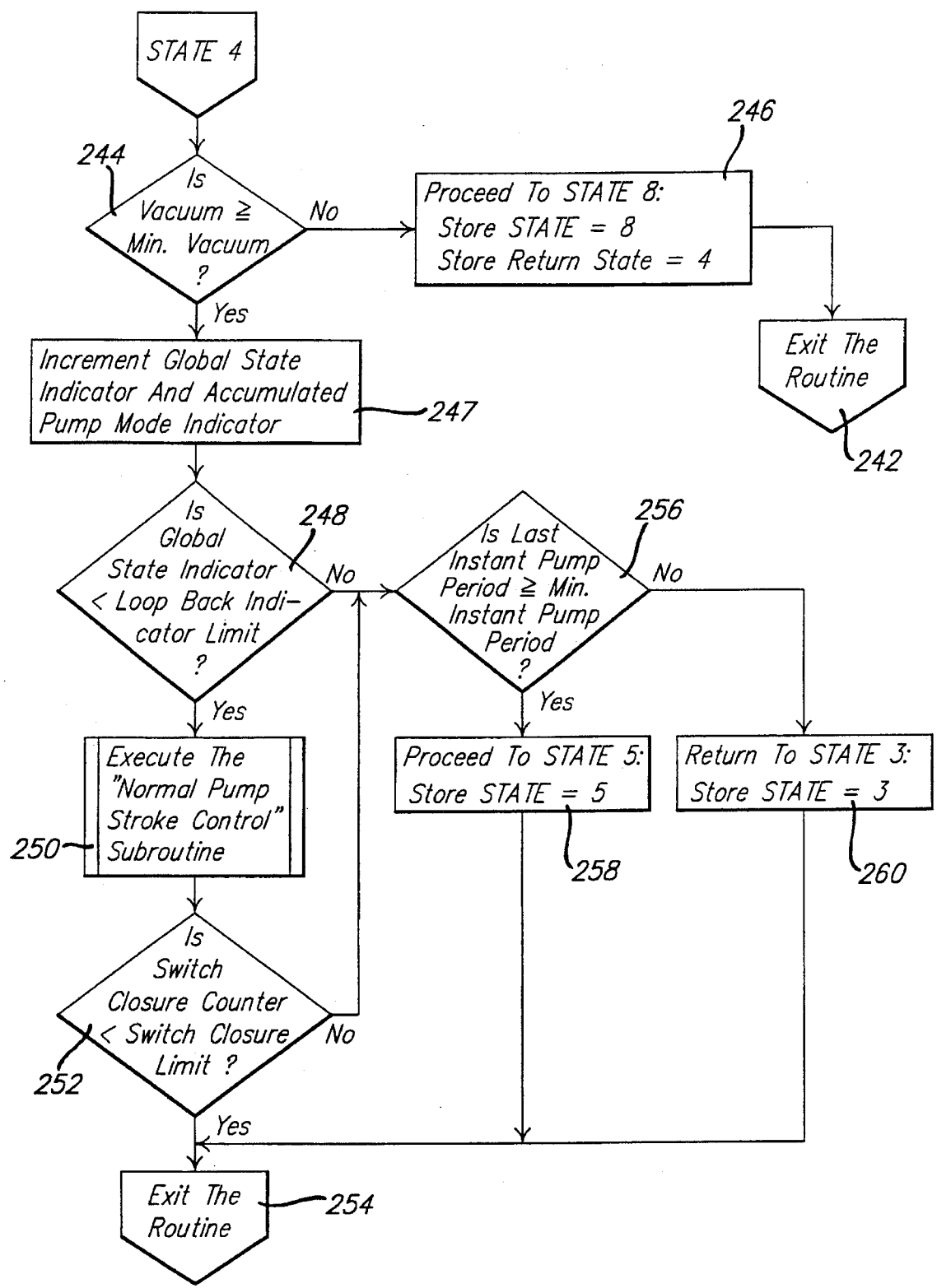
Figure 3H:
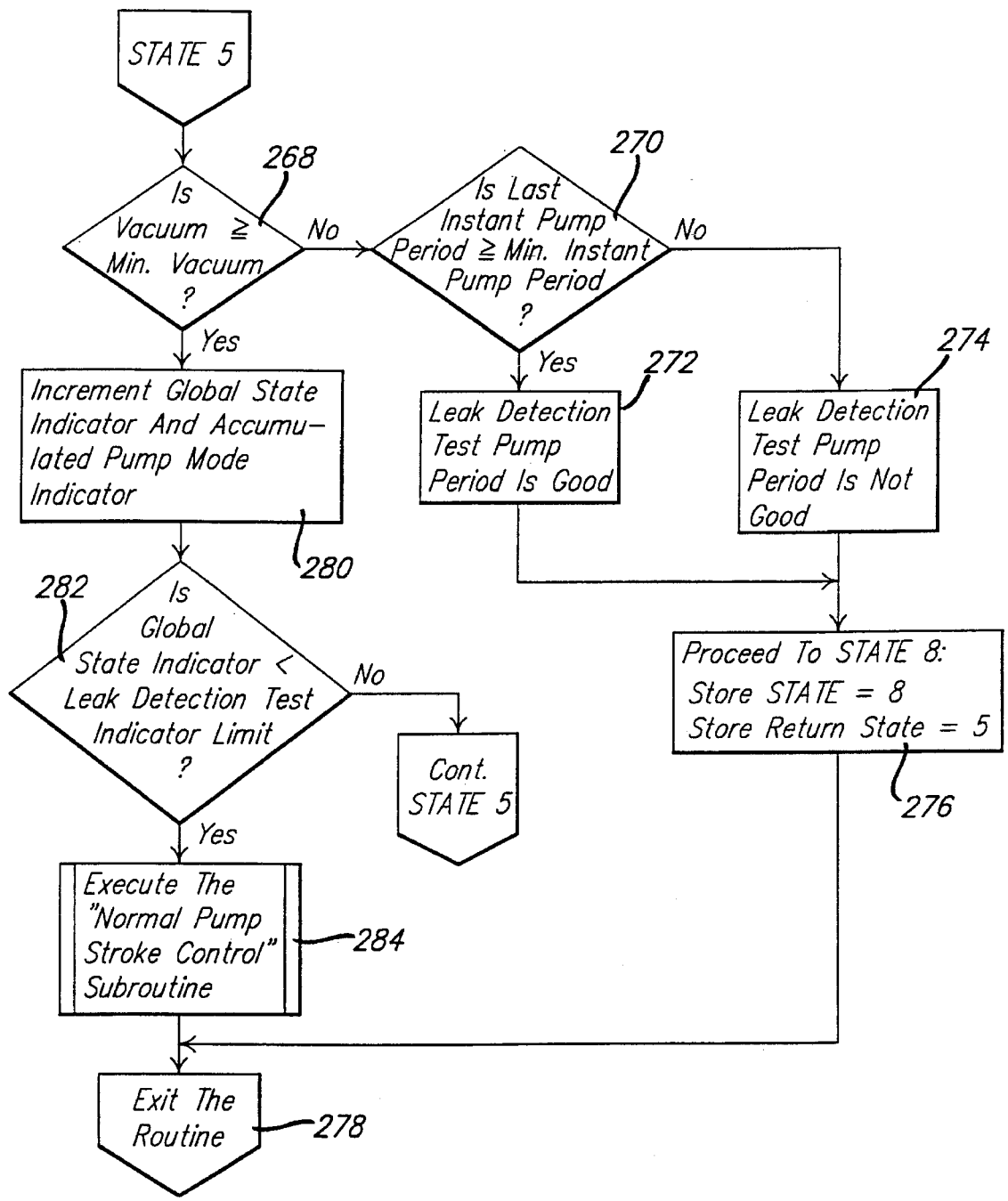
Figure 3I:
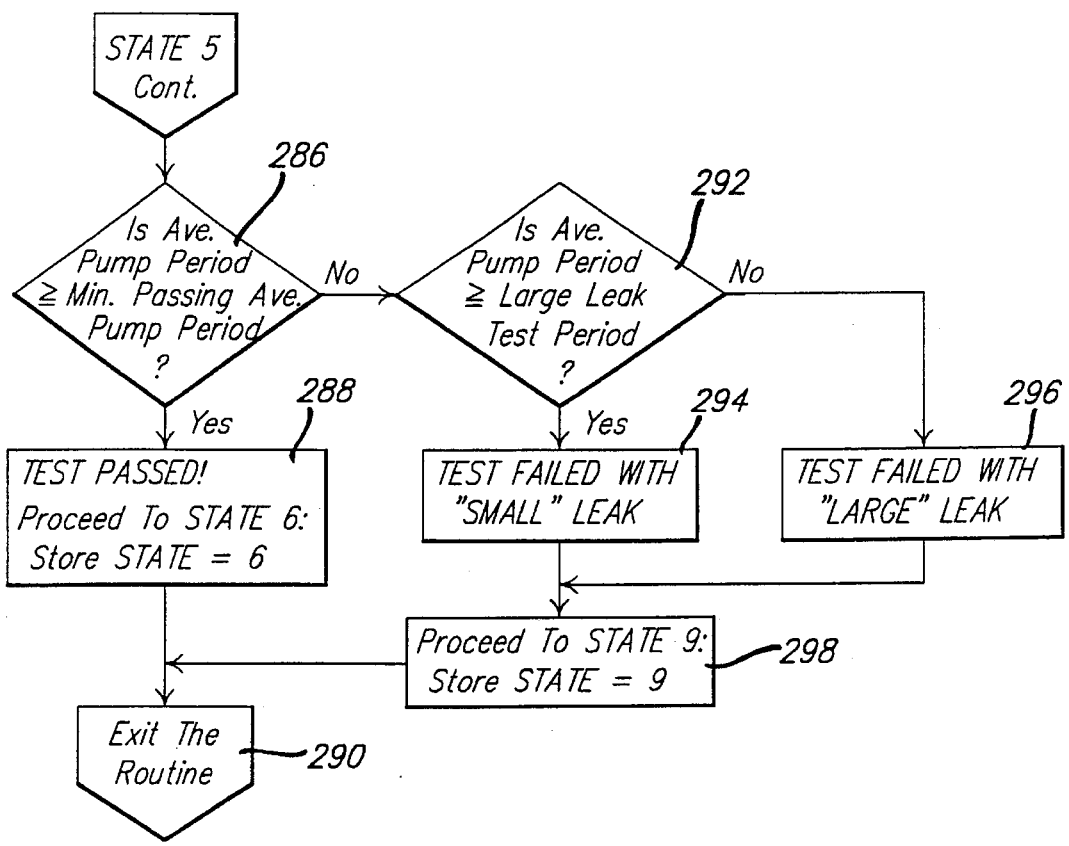
Figure 3J:
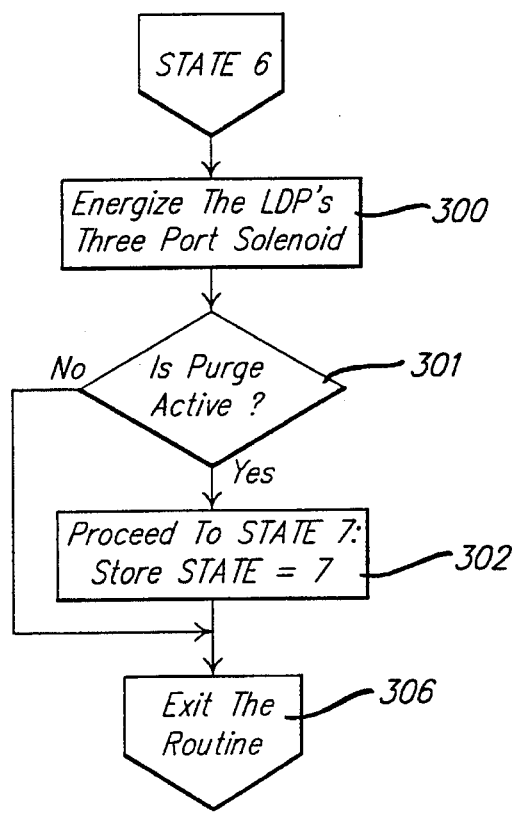
Figure 3K:
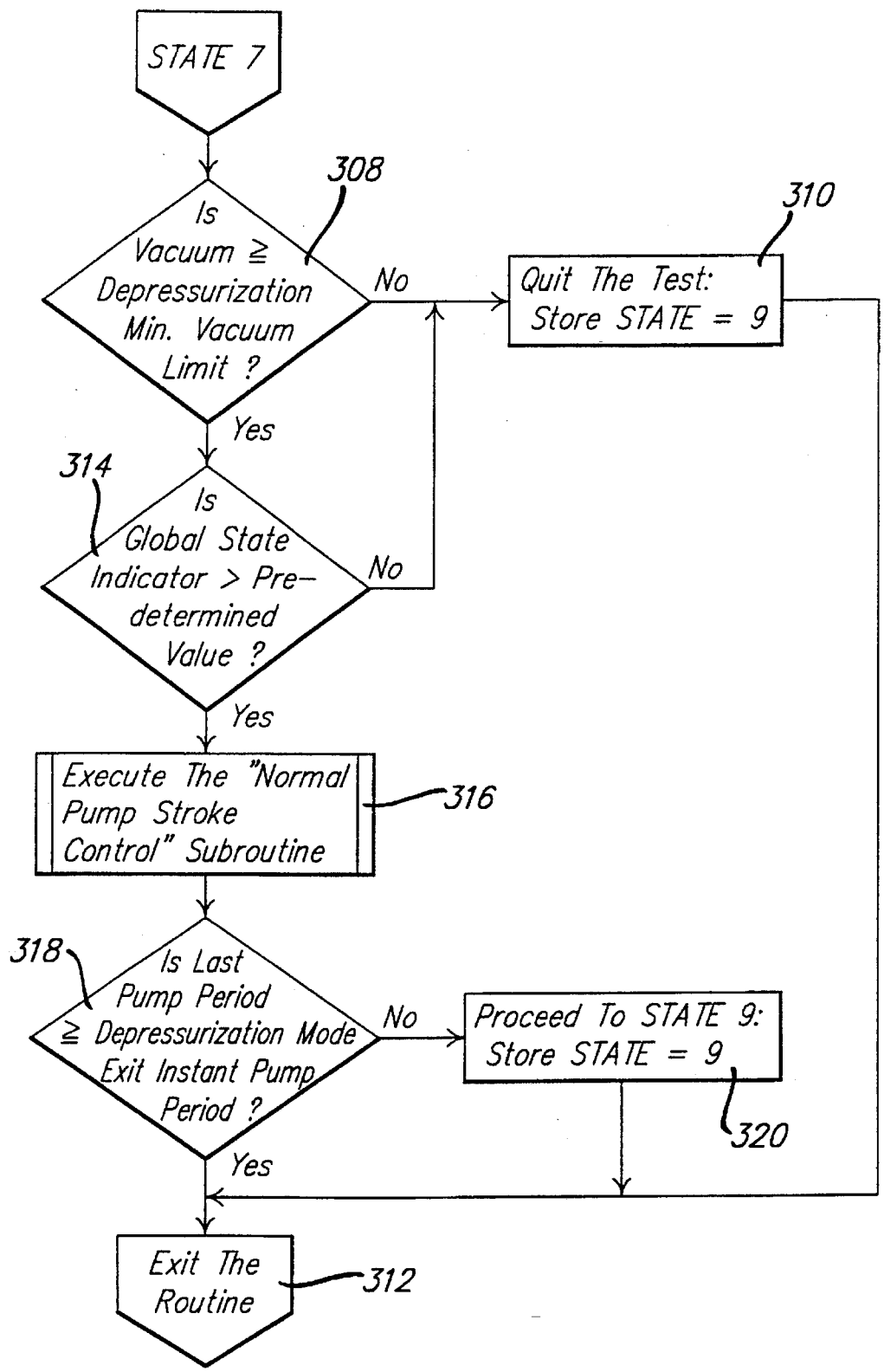
Figure 3L:
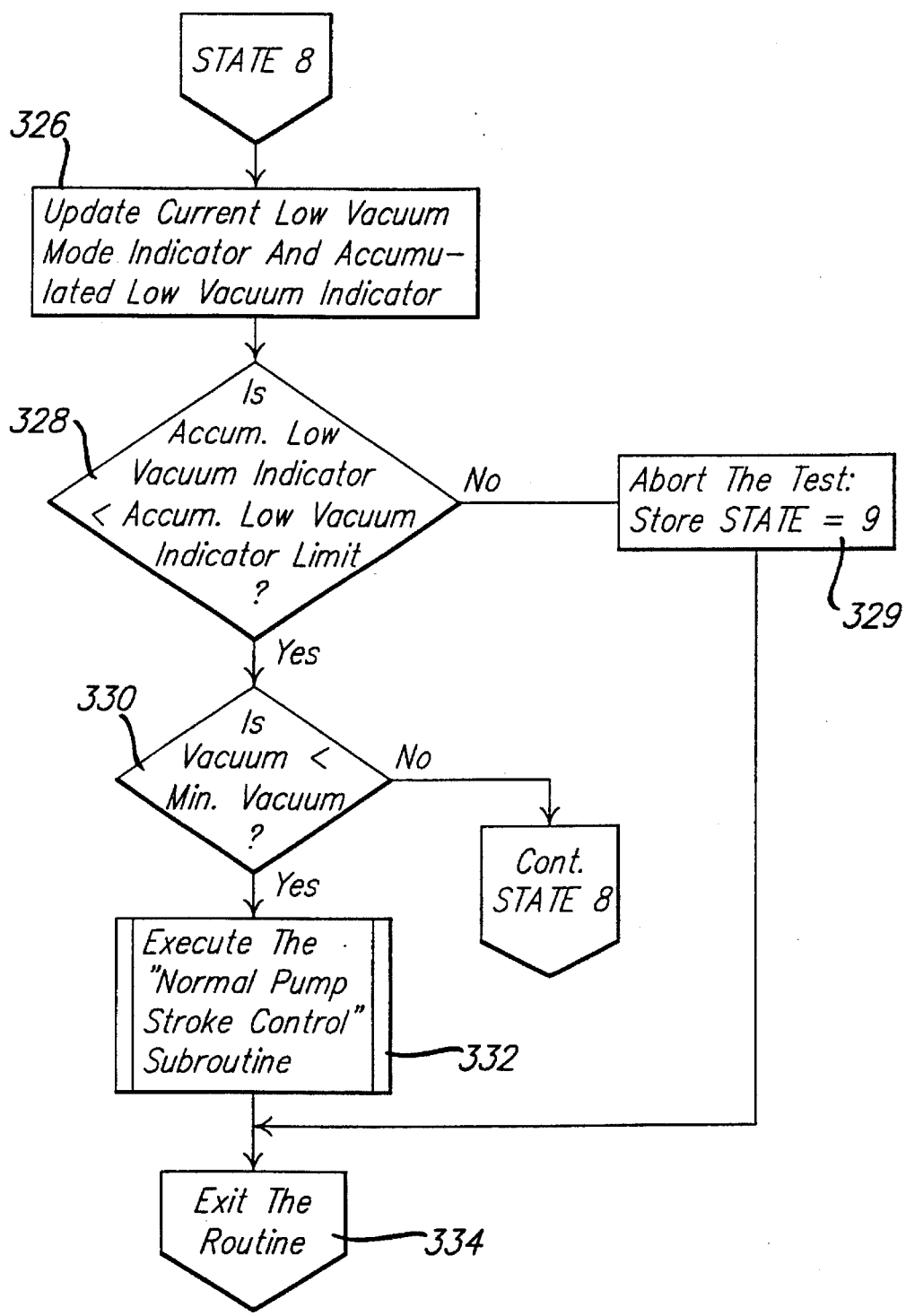
Figure 3M:
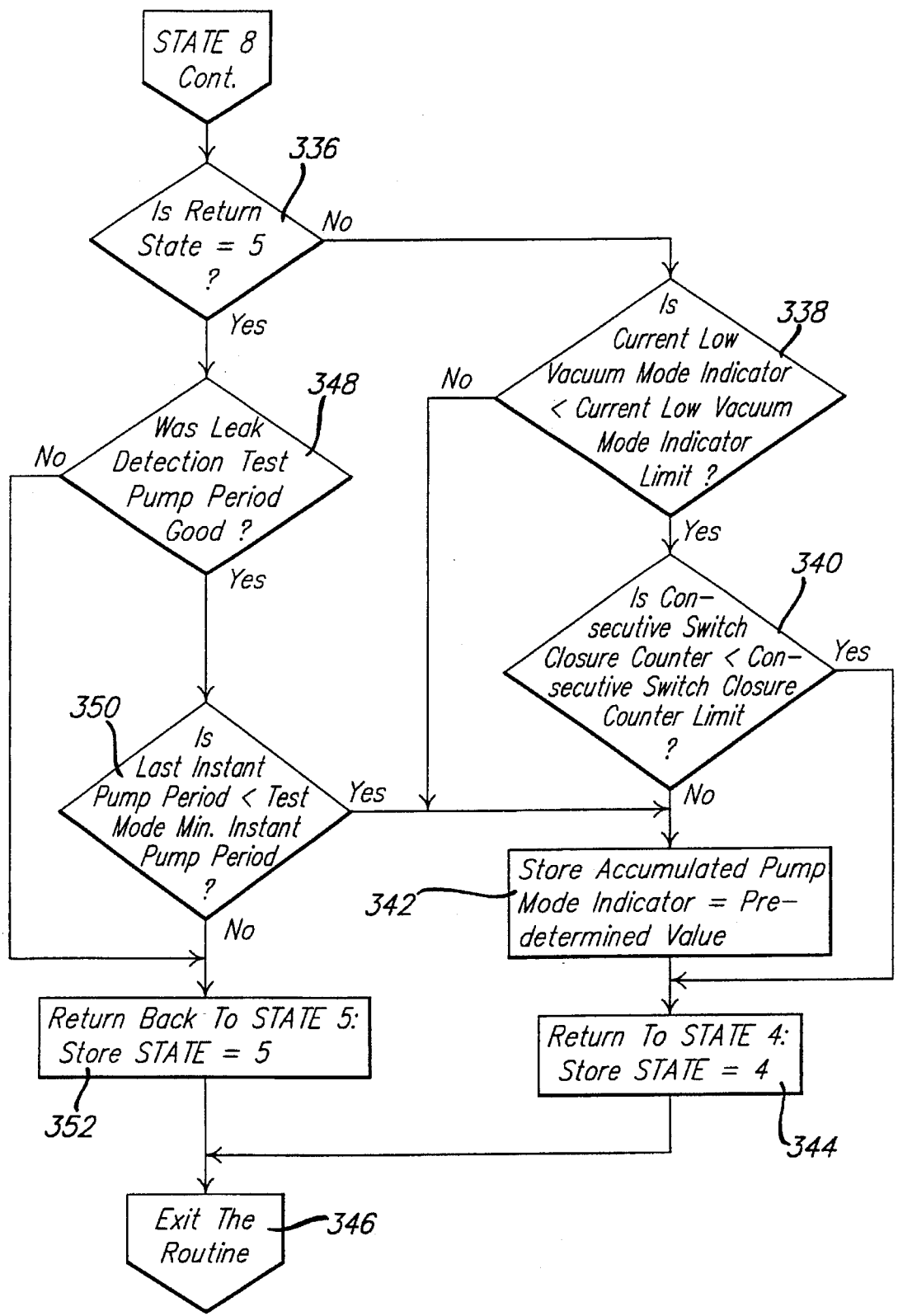
Figure 3N:
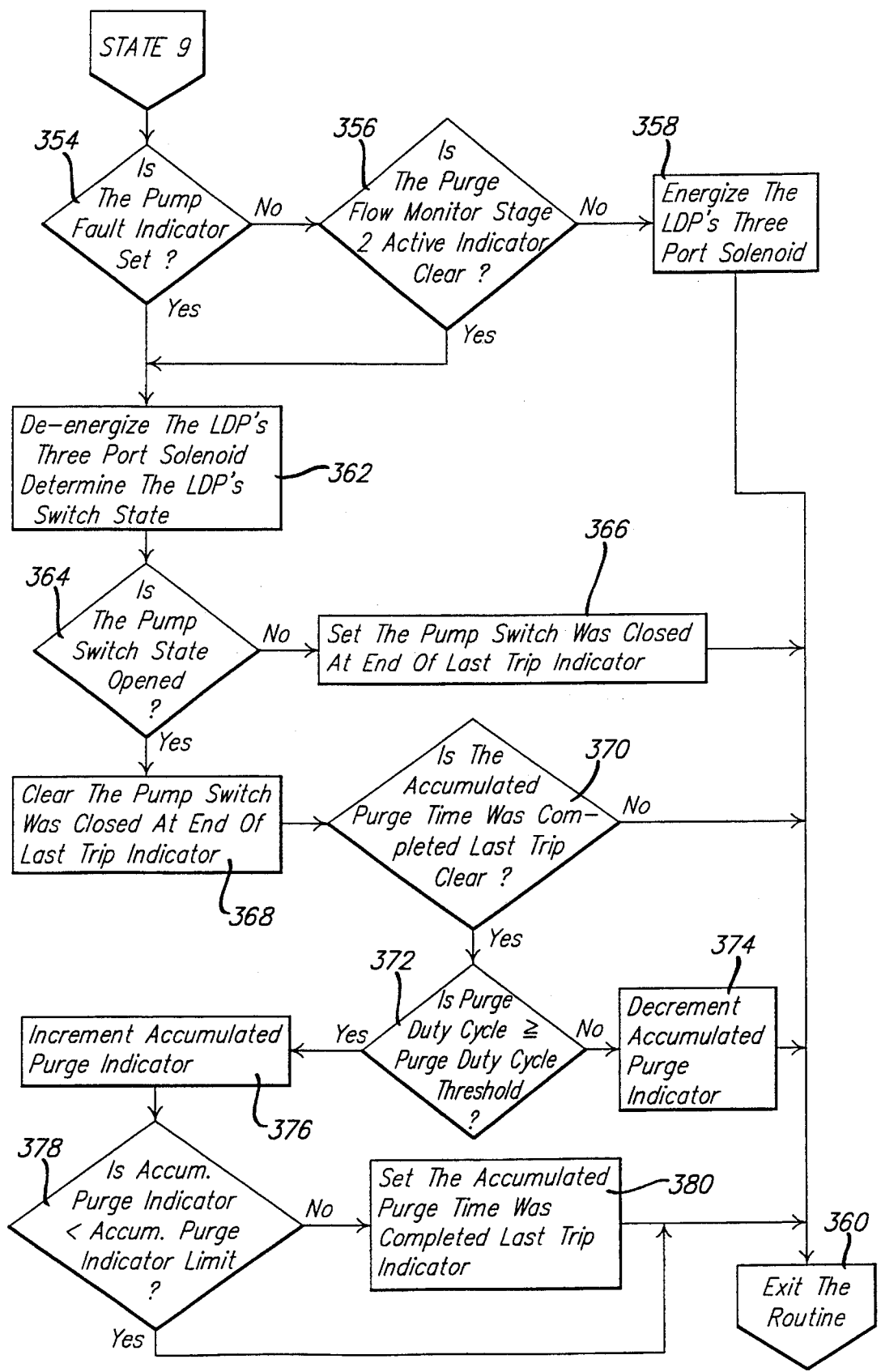
Figure 30:
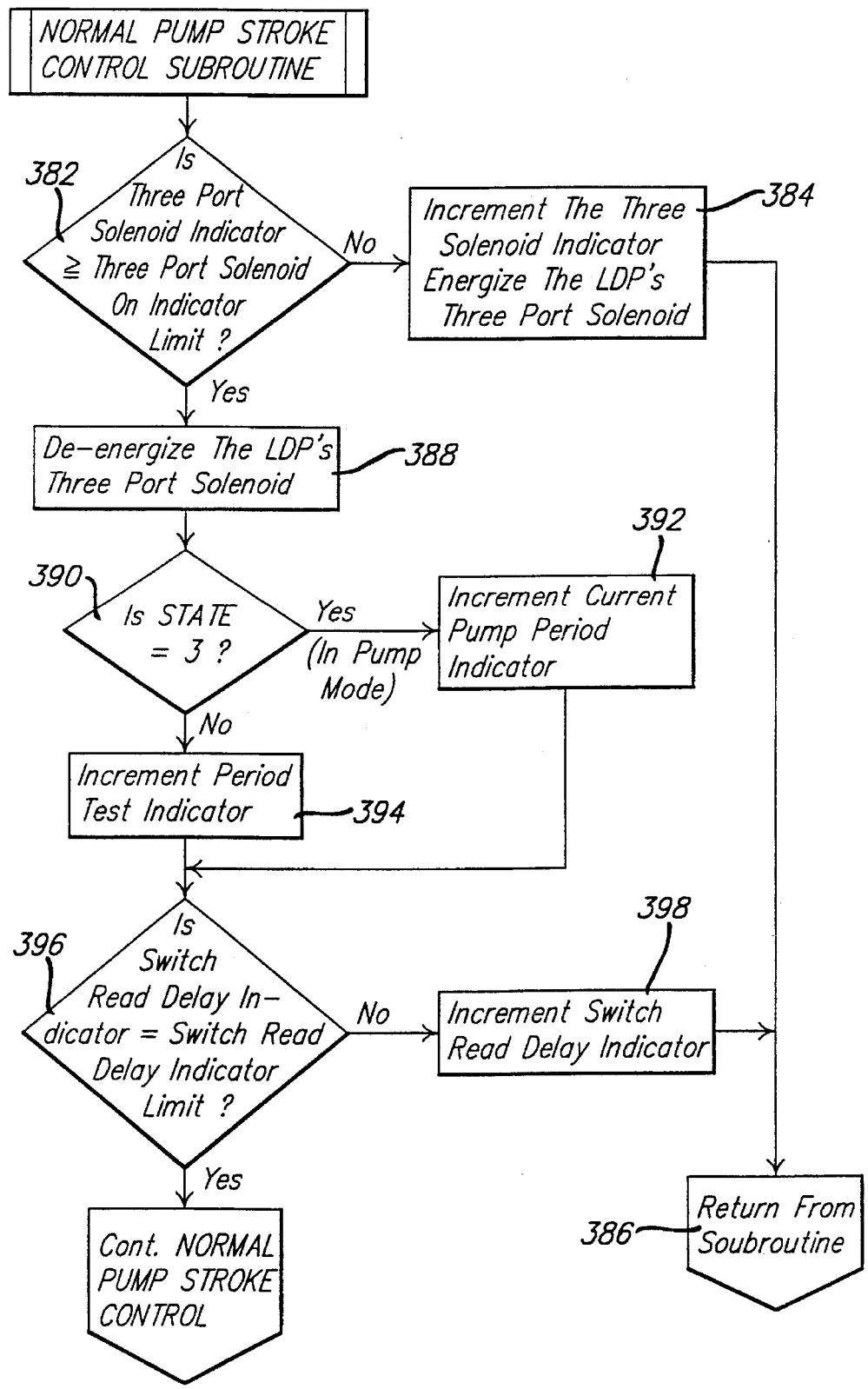
Figure 3P:
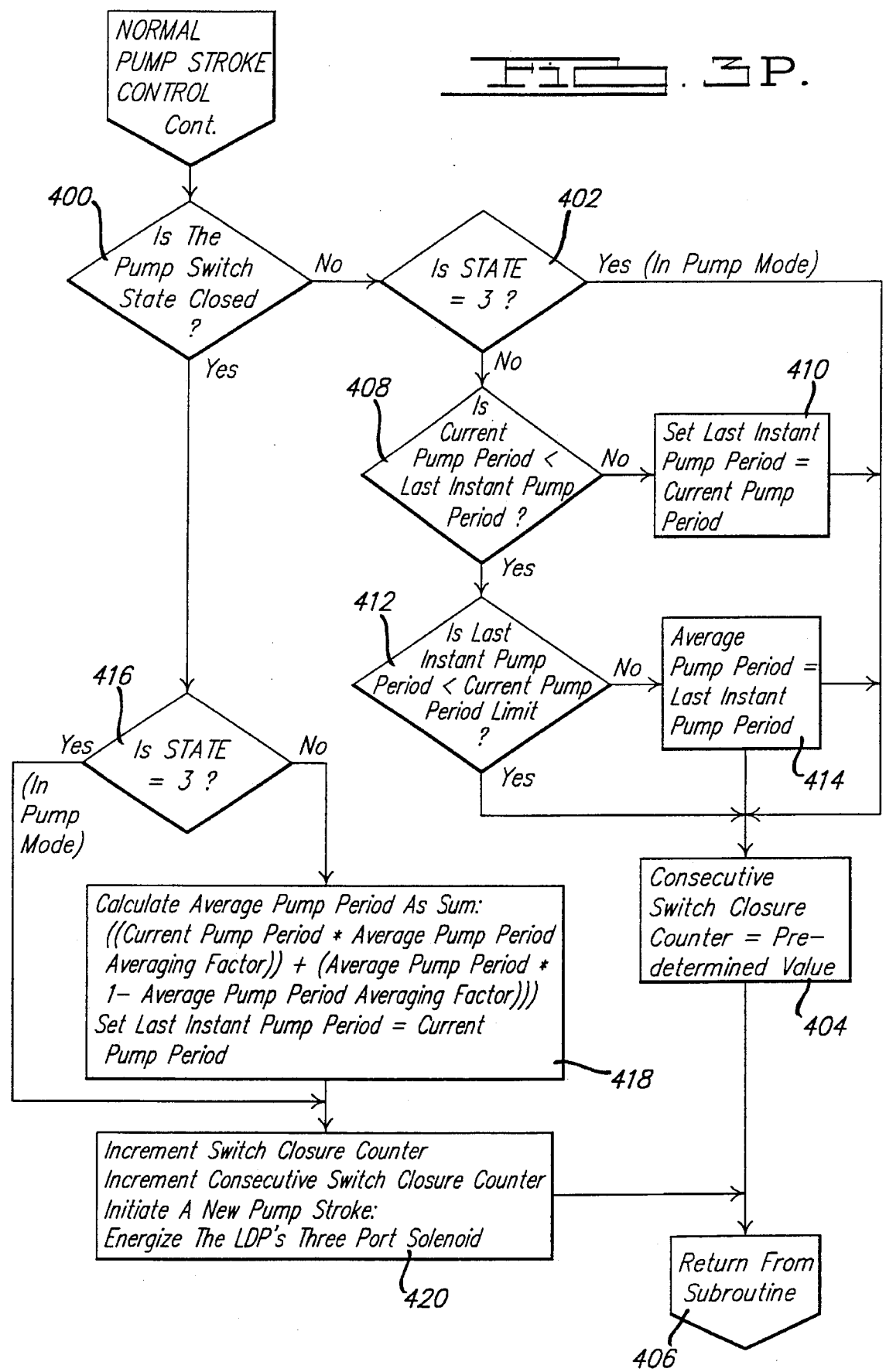

Referring to FIGS. 3A through 3P, a method of detecting a leak, according to the present invention, in the evaporative emission control system 10 is illustrated. The methodology begins in bubble 100 to perform tasks that re common to each periodic execution of the routine. The routine is executed on a continuous periodic basis such as once every eleven (11) milliseconds during normal engine operation. To perform the common tasks, the methodology advances to diamond 101 and determines whether the current test state is less than a predetermined test state such as nine (9). If not, the methodology advances to block 102 and jumps to one of the current test states of zero (0) through nine (9) to be described. If so, the methodology advances to diamond 103 and determines whether the engine (not shown) is in a run mode, for example, by looking for an indicator such as a flag. If not, the methodology advances to diamond 104 and determines whether the current test state is a predetermined test state of 0 or 1 to be described, for example, by looking for an indicator such as a flag. If the current test state is 0 or 1, the methodology advances to block 102 previously described. If the current test state is not 0 or 1, the methodology advances to block 110 and aborts a leak detection test to be described and sets the current test state to a predetermined test state of nine (9) to be described. After block 110, the methodology advances to block 102 previously described.

In diamond 103, if the engine is in the run mode, the methodology advances to diamond 105 and determines whether a voltage of a battery (not shown) is less than or equal to a predetermined maximum battery voltage such as 16.2 volts from an input to the ECU 26. If not, the methodology advances to block 110 previously described.

In diamond 105, if the battery voltage is not less than or equal to the predetermined maximum battery voltage, the methodology advances to diamond 106 and determines whether the battery voltage is greater than or equal to a predetermined minimum battery voltage such as nine (9) volts. If not, the methodology advances to block 110 previously described. If so, the methodology advances to diamond 107 and determines whether the purge system is active, for example, by looking for a flag. If not, the methodology advances to block 102 previously described. If so, the methodology advances to diamond 108 and determines whether the current test state is a predetermined test state of six (6) to be described. If not, the methodology advances to block 110 previously described. If so, the methodology advances to block 109 and sets the current test state to a predetermined test state of seven (7) to be described. After block 109, the methodology advances to block 102 previously described.

Referring to FIG. 3B, the methodology for the predetermined test state zero (0) is illustrated. The methodology for test state 0 begins in diamond 114 and determines whether the pump switch 48 is closed at the start of a trip for the vehicle from inputs to the ECU 26. If so, the methodology advances to block 116 and clears a test enable conditions met indicator. The methodology then advances to diamond 118 and determines whether a temperature representative of the ambient air is less than or equal to a predetermined maximum air temperature such as 90° F. If not, the methodology advances to block 120 and aborts the test and sets the current test state equal to a predetermined test state of nine (9). The methodology then advances to block 122 and exits the routine. In diamond 114, if pump switch 48 is not closed, the methodology then advances to diamond 124 and determines whether the pump switch 48 was closed at the end of the last vehicle trip, for example, by looking for an indicator such as a flag. If so, the methodology advances to block 120 previously described. If not, the methodology advances to diamond 126 and determines whether an accumulated purge time was completed the last vehicle trip, for example, by looking for an indicator such as a flag. If not, the methodology advances to block 120 previously described. If so, the methodology advances to block 128 and sets a pump fault indicator. The methodology then advances to block 120 previously described.

In diamond 118, if the ambient air temperature is less than or equal to the predetermined maximum air temperature, the methodology advances to diamond 129 and determines whether the ambient air temperature is greater than a predetermined minimum air temperature such as 40° F. If not, the methodology advances to block 130 to be described. If so, the methodology advances to diamond 132 and determines whether the absolute value of the ambient air temperature minus a temperature of the engine coolant from an input to the ECU 26 is less than a predetermined maximum temperature delta or difference such as 10° F. If not, the methodology advances to block 130 to be described. If so, the methodology advances to diamond 134 and determines whether a barometric pressure is greater than or equal to a minimum start-up barometric pressure such as 8500 ft. altitude from an input to the ECU 26. If so, the methodology advances to block 136 and sets the test enable conditions met indicator. If not or after block 136, the methodology advances to block 130 and energizes the three-port solenoid 36 by the ECU 26. The methodology then advances to block 138 and sets a plurality of predetermined indicators such as flags to proceed to predetermined test state one (1). The methodology then advances to block 122 previously described.

Referring to FIG. 3C, the methodology for test state one (1) is illustrated. For test state 1, the methodology begins in diamond 146 and determines whether a test pump indicator in the ECU 26 is equal to an initialization test pump indicator limit such as 0.5 seconds. If not, the methodology advances to block 148 and energizes the three-port solenoid 36. The methodology then advances to diamond 150 and determines whether a manifold vacuum is greater than or equal to a minimum vacuum such as 5" Hg. If not, the methodology advances to block 152 and clears the test purge system indicator. If so, the methodology advances to block 154 and periodically increments the test purge system indicator, such as once every fourth execution of the routine. From blocks 152 and 154, the methodology advances to block 156 and exits the routine.

In diamond 146, if the test pump indicator is equal to the initialization test pump indicator limit, the methodology advances to block 158 and de-energizes the three-port solenoid 36 by the ECU 26. The methodology then advances to diamond 160 and determines whether a switch read delay indicator in the ECU 26 is equal to a predetermined switch read delay indicator limit such as eleven (11) milliseconds. If not, the methodology advances to block 162 and increments the switch read delay indicator once every execution of the routine. The methodology then advances to block 156 previously described.

In diamond 160, if the switch read delay indicator is equal to the switch read delay indicator limit, the methodology advances to diamond 164 and determines whether the pump switch 48 is open, for example, by looking for an indicator such as a flag. If not, the methodology advances to block 166 and sets the pump fault indicator and aborts the leak detection test and sets the current test state equal to the predetermined test state of nine (9). The methodology advances to block 156 previously described.

In diamond 164, if the pump switch 48 is open, the methodology advances to block 168 and clears the pump fault indicator. The methodology then advances to diamond 170 and determines whether the test enable conditions met indicator has been set. If so, the methodology advances to block 172 and sets predetermined indicators to proceed to predetermined test state two (2). If not, the methodology advances to block 174 and aborts the leak detection test and sets the current test state equal to the predetermined test state of nine (9). From blocks 172 and 174, the methodology advances to block 156 previously described.

Referring to FIG. 3D, the methodology for the predetermined test state two (2) is illustrated. In FIG. 3D, for test state 2, the methodology begins in block 182 and periodically increments a global state indicator in the ECU 26, such as once every one hundred twenty-eighth (128th) execution of the routine. The methodology then advances to diamond 184 and determines whether the global state indicator is less than a pinched line test indicator limit in the ECU 26. If not, the methodology advances to diamond 186 and determines whether a last instant pump period is less than a pinched line test instant pump period fault threshold such as six (6) seconds. If so, the methodology advances to block 188 and concludes there is no possible pinched line such as by clearing an indicator such as a flag, proceeds to predetermined test state three (3), and sets predetermined indicators. If not, the methodology advances to block 190 and concludes a possible pinched line such as by setting an indicator such as a flag, proceeds to predetermined test state five (5), and sets predetermined indicators. From blocks 188 and 190, the methodology advances to block 192 and exits the routine.

In diamond 184, if the general state indicator is less than the pinched line test indicator limit, the methodology advances to block 194 and executes a normal pump stroke control subroutine of FIGS. 3O and 3P to be described. The methodology then advances to diamond 196 and determines whether the switch closure counter is less than a pinched line test switch closure counter limit. If not, the methodology advances to diamond 186 previously described. If so, the methodology advances to block 192 and exits the routine.

Referring to FIGS. 3E and 3F, the methodology for the predetermined test state three (3) is illustrated. In FIG. 3E, for test state 3, the methodology begins in diamond 204 and determines whether the engine vacuum level is greater than or equal to a predetermined minimum muscle vacuum such as 3" Hg. If so, the methodology advances to block 206 and periodically increments the global state indicator and an accumulated pump mode indicator in the ECU 26 such as once every one hundred twenty eight (128) execution of the routine. After block 206 or if the engine vacuum level is not greater than or equal to the predetermined minimum muscle vacuum in diamond 204, the methodology advances to diamond 208 and determines whether the accumulated pump mode indicator is less than a predetermined accumulated pump mode indicator limit. If not, the methodology advances to block 210 and sets the current test state equal to the predetermined test state of five (5) to proceed to test state 5. The methodology then advances to block 232 to be described.

In diamond 208, if the accumulated pump mode indicator is less than the accumulated pump mode indicator limit, the methodology advances to block 214 and executes the normal pump stroke control subroutine of FIGS. 3O and 3P to be described. The methodology then advances to diamond 216 and determines whether the current pump period indicator is less than a predetermined pump mode short-stroke pump period limit. If not, the methodology advances to block 218 to initiate a new pump stroke for example by setting predetermined indicators, energizing the three-port solenoid 36 and setting a consecutive switch closure counter in the ECU 26 equal to a predetermined value such as zero (0). After block 218 or if the current pump period indicator is less than the pump period limit, the methodology advances to diamond 220 and determines whether the consecutive switch closure counter is less than a predetermined consecutive switch closure counter limit such as ten (10) closures. If not, the methodology advances to block 222 and sets indicators such as the accumulated pump mode indicator equal to the maximum value of the accumulated pump mode indicator minus the pump mode indicator limit or zero (0) and sets the consecutive switch closure counter equal to zero (0).

Referring to FIG. 3F, after block 222 and if the switch closure counter is less than the switch closure counter limit in diamond 220, the methodology advances to diamond 224 and determines whether the initial pump mode done indicator is set. If so, the methodology advances to diamond 226 and determines whether the global state indicator is less than the predetermined pump mode indicator limit. If so, the methodology advances to block 228 and exits the routine. If not, the methodology advances to block 230 and sets the current test state to the predetermined test state of four (4) to proceed to test state 4. The methodology then advances to block 232 and, by way of example, sets the global state indicator and switch closure counter equal to zero (0), sets the initial pump mode done indicator and sets other predetermined indicators, and energizes the three-port solenoid 36. The methodology then advances to block 228 previously described.

In diamond 224, if the initial pump mode done indicator has not been set, the methodology advances to block 234 and calculates an initial pump mode indicator limit equal to an initial pump mode indicator limit value, stored in memory multiplied by predetermined constant. The methodology then advances to block 228 to exit the routine.

Referring to FIG. 3G, the methodology for the predetermined test state four (4) is illustrated. For test state 4, the methodology begins in diamond 244 and determines whether the engine vacuum level is greater than or equal to a predetermined minimum muscle vacuum such as 5" Hg. If not, the methodology advances to block 246 and sets predetermined indicators to proceed to the predetermined test state of eight (8). The methodology then advances to block 242 and exits the routine.

In diamond 244, if the engine vacuum level is greater than or equal to the predetermined minimum muscle vacuum, the methodology advances to block 247 and periodically increments the global state indicator and the accumulated pump mode indicator, such as once every one hundred twenty-eighth (128th) execution of the routine. The methodology then advances to diamond 248 and determines whether the global state indicator is less than a predetermined pump mode loop-back test indicator limit. If so, the methodology advances to block 250 and executes the normal pump stroke control subroutine of FIGS. 3O and 3P to be described. The methodology then advances to diamond 252 and determines whether the switch closure counter is less than a predetermined switch closure counter limit such as three (3) closures. If so, the methodology advances to block 254 and exits the routine.

If the general state indicator is not less than the pump mode loop-back test indicator limit in diamond 248 or the switch closure counter is not less than the switch closure counter limit in diamond 252, the methodology advances to diamond 256 and determines whether the last instant pump period is greater than or equal to a predetermined test mode minimum instant pump period threshold such as three (3) seconds. If so, the methodology advances to block 258 and sets predetermined indicators to proceed to the predetermined test state of five (5). If not, the methodology advances to block 260 and sets predetermined indicators to return to the predetermined test state 3. After blocks 258 and 260, the methodology advances to block 254 and exits the routine.

Referring to FIGS. 3H and 3I, the methodology for the predetermined test state five (5) is illustrated. In FIG. 3H, for test state 5, the methodology begins in diamond 268 and determines whether the engine vacuum level is greater than or equal to the predetermined minimum muscle vacuum. If not, the methodology advances to diamond 270 and determines whether the last instant pump period is greater than or equal to a predetermined test mode minimum instant pump period threshold. If so, the methodology advances to block 272 and indicates the leak detection test pump period is good. If not, the methodology advances to block 274 and indicates the leak detection test pump period is not good. From blocks 272 and 274, the methodology advances to block 276 and sets predetermined indicators to proceed to the predetermined test state of eight (8). The methodology then advances to block 278 and exits the routine.

In diamond 268, if the engine vacuum level is greater than or equal to the predetermined minimum muscle vacuum, the methodology advances to block 280 and periodically increments the global state indicator and the accumulated pump mode indicator, such as once every one hundred twenty-eighth (128th) execution of the routine. The methodology then advances to diamond 282 and determines whether the global state indicator is less than a predetermined leak detection test indicator limit such as forty (40) seconds. If so, the methodology advances to block 284 and executes the normal pump stroke control subroutine of FIGS. 3O and 3P to be described. The methodology then advances to block 278 previously described.

Referring to FIG. 3H, in diamond 282, if the global state indicator is not less than the leak detection test indicator limit, the methodology advances to diamond 286 in FIG. 3I and determines whether an average pump period is greater than or equal to a predetermined leak detection test minimum passing average pump period such as 2.5 seconds. If so, the methodology advances to block 288 and concludes that the leak detection test passed; indicators may be set such as clearing a leak detection test fail indicator, and a large leak detected indicator; and setting the current test state equal to the predetermined test state of six (6) to proceed to predetermined test state 6. The methodology then advances to block 290 and exits the routine for this loop.

In diamond 286, if the average pump period is not greater than or equal to the leak detection test minimum passing average pump period, the methodology advances to diamond 292 and determines whether the average pump period is greater than or equal to a predetermined large leak test period such as 1.4 seconds. If so, the methodology advances to block 294 and concludes that the leak detection test failed with "small" leak, sets an indicator that the leak detection test failed and clears the large leak detected indicator. If not, the methodology advances to block 296 and concludes that the leak detection test failed with a "large" leak, sets the leak detection test failed indicator and sets the large leak detected indicator. From blocks 294 and 296, the methodology advances to block 298 and sets the current test state equal to the predetermined test state of nine (9) to proceed to the predetermined test state 9. The methodology then advances to block 290 and exits the routine.

Referring to FIG. 3J, the methodology for the predetermined test state six (6) is illustrated. For test state 6, the methodology advances to block 300 and energizes the three-port solenoid 36. The methodology advances to diamond 301 and determines whether the purge system is active, for example, by looking at a signal from the engine control unit 26 that the purge solenoid 24 turned ON. If so, the methodology advances block 302 and sets predetermined indicators to proceed to the predetermined test state of seven (7). From block 302 or if the purge system is not active in diamond 301, the methodology advances to block 306 and exits the routine.

Referring to FIG. 3K, the methodology for the predetermined test state seven (7) is illustrated. For test state 7, the methodology advances to diamond 308 and determines whether the engine vacuum level is greater than or equal to a predetermined system de-pressurization minimum vacuum limit such as the 3" Hg. If not, the methodology advances to block 310 and quits the leak detection test and sets the current test state equal to the predetermined test state of nine (9). The methodology then advances to block 312 and exits the routine.

In diamond 308, if the engine vacuum level is greater than or equal to a predetermined system depressurization minimum vacuum limit, the methodology advances to diamond 314 and determines whether the global state indicator is greater than or equal to a predetermined value such as zero (0). If not, the methodology advances to block 310 previously described. If so, the methodology advances to block 316 and executes the normal pump stroke control subroutine of FIGS. 3O and 3P to be described. The methodology then advances to diamond 318 and determines whether the last instant pump period is greater than or equal to a predetermined system de-pressurization minimum exit instant pump period. If not, the methodology advances to block 320 and sets the current test state equal to the predetermined test state of nine (9) to proceed to the predetermined test state 9. If so, the methodology advances to block 312 and exits the routine.

Referring to FIGS. 3L and 3M, the methodology for the predetermined test state eight (8) is illustrated. In FIG. 3L, for test state 8, the methodology begins in block 326 and periodically updates a current low vacuum mode indicator and an accumulated low vacuum indicator in the ECU 26 such as once every one hundred and twenty-eighth (128th) execution of the routine. The methodology then advances to diamond 328 and determines whether the accumulated low vacuum indicator is less than a predetermined accumulated low vacuum indicator limit such as thirty (30) seconds. If not, the methodology advances to block 329 and aborts the test and sets the current test state equal to the predetermined test state of nine (9). The methodology then advances to block 334 and exits the routine.

In diamond 328, if the accumulated low vacuum indicator is less than the predetermined accumulator low vacuum indicator limit, the methodology advances to diamond 330 and determines whether the engine vacuum level is less than the predetermined minimum muscle vacuum. If so, the methodology advances to block 332 and executes the normal pump stroke control subroutine of FIGS. 3O and 3P to be described. The methodology then advances to block 334 and exits the routine.

Referring to FIG. 3L, in diamond 330, if the engine vacuum level is not less than the predetermined minimum muscle vacuum, the methodology advances to diamond 336 in FIG. 3M and determines whether a return test state register in the ECU 26 equals a predetermined value such as five (5). If not, the methodology advances to diamond 338. In diamond 338, the methodology determines whether the current low vacuum mode indicator is less than a predetermined current low vacuum mode indicator limit such as ten (10) seconds. If so, the methodology advances to diamond 340 and determines whether the consecutive switch closure counter is less than a predetermined consecutive switch closure counter limit such as five (5) closures. If not or if the current low vacuum mode indicator is not less than the current low vacuum indicator limit in diamond 338, the methodology advances to block 342 and sets the accumulated pump mode indicator equal to a predetermined value such as zero (0). After block 342 or if the current switch closure counter is greater than the consecutive switch closure counter limit in diamond 340, the methodology advances to block 344 and sets predetermined indicators to return to the predetermined test state 4. The methodology then advances to block 346 and exits the routine.

In diamond 336, if the return test state register is equal to five (5), the methodology advances to diamond 348 and determines whether the leak detection test pump period was good as established in block 272 or block 274 of FIG. 3H, for example by checking whether an indicator has been set. If so, the methodology advances to diamond 350 and determines whether the last instant pump period is less than a predetermined test mode minimum instant pump period threshold such as 2.5 seconds. If so, the methodology advances to block 342 previously described. If not or if the leak detection test pump period is good indicator has not been set in diamond 348, the methodology advances to block 352 and sets the current test state to return back to the predetermined test state 5. After block 352, the methodology advances to block 346 and exits the routine.

Referring to FIG. 3N, a methodology for the predetermined test state of nine (9) is illustrated. For test state 9, the methodology begins in diamond 354 and determines whether the pump fault indicator has been set. If not, the methodology advances to diamond 356 and determines whether a purge flow monitor stage 2 active indicator has been cleared. If not, the methodology advances to block 358 and energizes the three-port solenoid 36, and sets indicators. The methodology then advances to block 360 and exits the routine.

If the pump fault indicator has been set in diamond 354 or if the purge flow monitor stage 2 active indicator has been cleared in diamond 356, the methodology advances to block 362 and de-energizes the three-port solenoid 36 and determines the pump switch 48 state. The methodology then advances to diamond 364 and determines whether the pump switch 48 state is open. If not, the methodology advances to block 366 and sets the pump switch was closed at end of last trip indicator.

In diamond 364, if the pump switch 48 state is open, the methodology advances to block 368 and clears the pump switch was closed at end of last trip indicator. The methodology then advances to diamond 370 and determines whether the accumulated purge time was completed last trip indicator has been cleared. If not, the methodology advances to block 360 previously described. If so, the methodology advances to diamond 372 and determines whether the purge duty cycle indicator in the ECU 26 is greater than or equal to an accumulated purge duty cycle threshold such as 15% of the duty cycle. If not, the methodology advances to block 374 and periodically decrements the accumulated purge indicator such as once every sixteenth (16th) execution of the routine. The methodology then advances to block 360 previously described.

In diamond 372, if the purge duty cycle indicator is greater than or equal to the accumulated purge duty cycle threshold, the methodology advances to block 376 and periodically increments the accumulated purge indicator such as once every sixteenth (16th) execution of the routine. The methodology then advances to diamond 378 and determines whether the accumulated purge indicator is less than an accumulated purge indicator limit such as fifteen (15) seconds. If so, the methodology advances to block 360 previously described. If not, the methodology advances to block 380 and sets the accumulated purge time was completed last trip indicator. The methodology then advances to block 360 and exits the routine.

Referring to FIGS. 3O and 3P, a methodology for the normal pump stroke control subroutine is illustrated. In FIG. 3O, for the normal pump stroke control subroutine, the methodology begins in diamond 382 and determines whether the three-port solenoid indicator is equal to a predetermined normal pulse three-port solenoid ON indicator limit such as two hundred fifty (250) milliseconds. If not, the methodology advances to block 384 and increments the three-port solenoid indicator, such as once every execution of the subroutine and energizes the three-port solenoid 36. The methodology then advances to block 386 and returns from the subroutine.

In diamond 382, if the three-port solenoid indicator is equal to the normal pulse three-port solenoid ON indicator limit, the methodology advances to block 388 and de-energizes the three-port solenoid 36. The methodology then advances to diamond 390 and determines whether the current test state is equal to the predetermined test state of three (3). If so, the methodology advances to block 392 and periodically increments the current pump period indicator such as once every execution of the subroutine. If not, the methodology advances to block 394 and periodically increments the period test indicator, such as once every eighth (8th) execution of the subroutine. From blocks 392 and 394, the methodology advances to diamond 396 and determines whether a switch read delay indicator in the ECU 26 is equal to a predetermined switch read delay indicator limit such as eleven (11) milliseconds. If not, the methodology advances to block 398 and increments the switch read delay indicator once every execution of the subroutine. The methodology then advances to block 386 previously described.

Referring to FIG. 3O, in diamond 396, if the switch read delay indicator is equal to the switch read delay indicator limit, the methodology advances to diamond 400 in FIG. 3P and determines whether the pump switch 48 state is closed, for example, by looking for an indicator. If not, the methodology advances to diamond 402 and determines whether the current test state is equal to the predetermined test state of three (3). If so, the methodology advances to block 404 and sets the consecutive switch closure counter equal to a predetermined value such as zero (0). The methodology then advances to block 406 and returns from the subroutine.

In diamond 402, if the current test state is not equal to the predetermined test state of (3), the methodology advances to diamond 408 and determines whether the current pump period indicator is less than the last instant pump period. If not, the methodology advances to block 410 and sets the last instant pump period equal to the current pump period indicator. The methodology then advances to block 404 previously described.

In diamond 408, if the current pump period is less than the last instant pump period, the methodology advances to diamond 412 and determines whether the last instant pump period is less than a current pump period limit. If so, the methodology advances to block 404 previously described. If not, the methodology advances to block 414 and sets the average pump period equal to the last instant pump period. After block 414, the methodology advances to block 404 previously described.

In diamond 400, if the pump switch 48 state is closed, the methodology advances to diamond 416 and determines whether the current test state is equal to the predetermined test state of three (3). If not, the methodology advances to block 418 and calculates an average period, for example by adding the product of current pump period multiplied by an average pump period averaging factor to the product of the average pump period multiplied by the difference of one (1) minus the average pump period averaging factor; and sets the last instant pump period equal to the current pump period.

After block 418 or if the current test state is equal to the predetermined test state of three (3) in diamond 416, the methodology advances to block 420 and increments the consecutive switch closure counter and switch closure counter, initiates a new pump stroke and energizes the three-port solenoid 36. After block 420, the methodology advances to block 406 and returns from the subroutine.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A method of testing an evaporative emission control system to determine if the evaporative emission control system has reached a predetermined pressure, said method comprising the steps of:

pulsing a leak detection pump at a predetermined rate;

determining if a last pump period is greater than or equal to a predetermined test mode period threshold;

pressurizing the evaporative emission control system if the last pump period is less than a test mode period threshold; and continuing said method if the last pump period is equal to or greater than the test mode period threshold.

2. A method as set forth in claim 1 including the step of determining whether a general state indicator is less than a predetermined pump mode test limit prior to said step of determining.

3. A method as set forth in claim 2 including the step of continuing pulsing a leak detection pump if the general state indicator is less than the predetermined pump mode test limit.

4. A method as set forth in claim 1 including the step of:

continuously monitoring an engine vacuum level;

determining if the engine vacuum level is greater than or equal to a predetermined minimum engine vacuum level; and continuing pulsing the leak detection pump until the engine vacuum level is greater than the minimum engine vacuum level.

5. A method of testing an evaporative emission control system to determine if the evaporative emission control system has reached a predetermined pressure, said method comprising the steps of:

pulsing a leak detection pump at a predetermined rate;

determining whether a general state indicator is less than a predetermined pump mode test limit;

continuing pulsing a leak detection pump if the general state indicator is less than the pump mode test limit;

determining whether a switch closure counter is less than a predetermined switch closure counter limit;

determining if a last pump period is greater than or equal to a predetermined test mode period threshold if the general state indicator is greater than or equal to a pump mode test limit or if a switch closure counter is greater than or equal to the switch closure counter limit;

continuing pressurizing the evaporative emission control system if the last pump period is less than a test mode period threshold; and continuing said method if the last pump period is equal to or greater than the test mode period threshold.

6. A method as set forth in claim 5 including the step of:

continuously monitoring an engine vacuum level;

determining if the engine vacuum level is greater than or equal to a predetermined minimum engine vacuum level; and continuing pulsing the leak detection pump until the engine vacuum level is greater than the minimum engine vacuum level.

* * * * *